United States Patent [19]
Peters et al.

[11] 3,754,959
[45] Aug. 28, 1973

[54] TRANSFER MEDIUM

[75] Inventors: Gary J. Peters, Dayton; Stanley R. Hermann, Xenia, both of Ohio

[73] Assignee: The National Cash Register Company, Dayton, Ohio

[22] Filed: Aug. 31, 1971

[21] Appl. No.: 176,739

[52] U.S. Cl. .................. 117/3.1, 117/3.4, 117/235, 260/856
[51] Int. Cl. ...................... B41m 3/12, H01f 10/02
[58] Field of Search .................... 117/235, 3.1–3.6, 117/36.1–36.4; 260/856

[56] References Cited
UNITED STATES PATENTS

| | | | |
|---|---|---|---|
| 3,639,166 | 2/1972 | Fellows et al. | 117/36.1 X |
| 3,663,278 | 5/1972 | Blose et al. | 117/36.1 X |
| 3,658,567 | 4/1972 | Newman et al. | 117/36.1 |
| 3,619,290 | 11/1971 | Deegan | 117/235 |
| 3,404,021 | 10/1968 | Newman et al. | 117/235 |
| 2,103,082 | 12/1937 | Lawrence | 117/3.2 |
| 3,497,411 | 2/1970 | Chebiniak | 117/3.2 |

Primary Examiner—William D. Martin
Assistant Examiner—Bernard D. Pianalto
Attorney—E. Frank McKinney et al.

[57] ABSTRACT

Sensible coatings comprised of a colored sensible material in a binder of aminotriazine resin and a polymeric material are disclosed. The coatings can be placed on a transfer base such as polyethylene terephthalate and transferred to enpaneled plastic card bases. These machine sensible cards are resistant to scratching and other surface damage. The sensible coating is easily transferred in one step and permanently heat sealed in a second step.

2 Claims, No Drawings

TRANSFER MEDIUM

This invention relates to sensible coatings, transfer media, plastic cards and processes for transferring and fusing the sensible coatings to the cards.

Scratch resistant coatings and transfer media thereof are known in the art, see United States Patent application, Ser. No. 35,230 filed on May 6, 1970, now U.S. Pat. No. 3,639,166. This application discloses a coating of an olefinic polymer, a wax, an aminotriazine-sulfonamide-formaldehyde resin and a sensible material.

Aminotriazine-sulfonamide-formaldehyde resin hereinafter will be referred to as aminotriazine resin.

Colored, sensible coatings now been found. These coatings consist essentially of a sensible material in a binder of aminotriazine resin in combination with a polymeric material. Transfer media are formed by coating a solution of the sensible material, the aminotriazine resin and the polymeric material on a transfer sheet such as polyethylene terephthalate and allowing the solvent to evaporate. The sensible coating then can be transferred by pressure alone or in combination with heat to an enpaneled plastic card base. The sensible coating easily is transferred in one step and permanently heat fused in a second step.

Accordingly, an object of this invention is to provide sensible coatings.

Another object of this invention is to provide transfer media.

Still another object of this invention is to provide enpaneled plastic cards with sensible coatings thereon.

An additional object of this invention is to provide a process for transferring and fusing the sensible coatings to the enpaneled plastic cards.

Other objects, aspects and advantages of this invention will be apparent to one skilled in the art from the following specification and appended claims.

The colored, sensible coatings of this invention comprise, on a wet basis, aminotriazine resin, polymeric material, sensible material and solvent. On a dry basis, the colored sensible coatings comprise aminotriazine, polymeric material and a sensible material.

On a dry basis, the sensible coatings comprise 10 to 25 weight percent of polymeric material, 60 to 85 weight percent of aminotriazine resin and 5 to 25 weight percent of sensible material. The wet solution generally contains 40 to 70 weight percent solvent, preferably 60 to 70 weight percent.

The sensible coating can be prepared by any means known to the art which assures a uniform mixture of the aminotriazine resin, polymer, sensible material and solvent. The wet sensible coating can be applied to the transfer base by roll coating, knife coating or any other means known to the art. The solvent can be evaporated at ambient temperature or can be evaporated by the application of heat.

The sensible coating can contain small amounts of additives to accomplish a particular desired effect. For example, a small amount of polybutadiene can be added to aid in releasing the sensible coating from the transfer base.

The aminotriazine resins that can be employed in this invention are described in the previously mentioned United States Patent application, Ser. No. 35,230 at page 9, line 17 to page 15, line 17, the disclosure of the resin being incorporated herein by reference.

The solvent employed in this invention generally is an aliphatic or aromatic hydrocarbon solvent such as mineral spirits, naphtha, xylene, toluene, methyl ethyl ketone or mixtures thereof. Other solvents that can be employed in this invention are isoamyl acetate, ethyl amyl ketone, diisobutyl ketone, carbon tetrachloride, or mixtures thereof.

The sensible materials employed in this invention are described in previously mentioned United States Patent application, Ser. No. 35,230 at page 15, line 18 to page 17, line 8, the disclosure of the sensible material being incorporated herein by reference.

The plastic card base is a sheet of polyvinyl chloride or polyvinyl chloride-polyvinyl acetate copolymer. The plastic card base generally is a laminated sheet. The sheet normally will have the dimensions of a typical credit card or identification card, i.e. 3⅜ inch × 2 inch × ⅛ inch.

The plastic card base is enpaneled with a white $TiO_2$ pigmented coating as described in United States Patent application, Ser. No. 176,737, filed Aug. 31, 1971 in the name of John J. Bishop.

The transfer base to which the sensible coating is applied is a thin, flexible carrier substrate such as a film, web, sheet, ribbon, fabric or the like. The preferred base is a film of polyethylene terephthalate. Other transfer bases are cellulosic materials, cellophane, nylon, rubber hydrochloride, polyethylene, polypropylene or the like. The transfer base generally has a thickness of 0.2 to 2 mils, preferably 0.3 to 1 mil.

After the wet coating has been applied to the transfer base and the solvent has evaporated, the resulting transfer media then is placed over the panel of the plastic card sheet with the sensible coating in contact with the panel. The transfer media is subjected to a pressure ranging from 20 to 15,000 psi for a time ranging from 5 milliseconds to 1 second. Preferably, the present ranges from 10,000 to 15,000 psi and the time ranges from .5 to 25 milliseconds. The transfer base ispicked or peeled off of the panel leaving the plastic card with the sensible coating adhered to the panel. Generally, the panel is in the form of a one-quarter inch stripe across the card in a horizontal or vertical direction. The heat fusing step is carried out at a pressure ranging up to 100 psi, a temperature ranging from 225° to 300° F. and a time ranging from 0.1 to 1 seconds. Preferably, the pressure ranges up to 40 psi, the temperature ranges from 225° to 275° V. and the time is 0.5 second. The resulting plastic card possesses a minimum of distortion, provides a smooth coating and is tack free at room temperature.

The coatings of this invention provide print bars with excellent compatibility for the enpaneled plastic card base and the heat fusing step which permanently heat fuses the coating panel and plastic card base. The coatings of this invention also have excellent ultra-violet light resistance and shelf stability, including shelf stability at high storage temperatures.

In another embodiment of this invention, a clear film overlay such as the transfer base of polyethylene terephthalate, or a polyvinyl chloride or polyvinyl chloride-polyvinyl acetate copolymer can be bonded to the plastic card over the coated, paneled surface under conditions of time, pressure and temperature as described for the heat fusing step of this invention. The overcoat can be applied on a wet or dry basis. Such coatings are employed where certain surface damage would be highly harmful. However, the described coating system is able to provide extremely durable coatings or panels without protective overlays after printing.

The advantages of this invention are further illustrated by the follwoing example. The materials, proportions and other specific conditions are presented as being typical and should not be construed to limit the invention unduly.

EXAMPLE I

Two uniform solvent dispersions were prepared according to the following specifications:

| Component | Percent by Weight | |
|---|---|---|
| | Green Coating | Black Coating |
| isobutyl methacrylate (1) | 7 | 7 |
| melamine-sulfonamide-formaldehyde resin containing a fluorescent green dye (2) | 11 | |
| melamine-sulfonamide-formaldehyde resin containing a fluorescent blue dye (3) | 15 | 21 |
| Monastral Green "B" Pigment (4) | 1 | |
| MO-4234 magnetic iron oxide (5) | | 7 |
| Toluene | 66 | 65 |

(1) Marketed by E. I. duPont de Nemours & Co., Inc. under the trademark, Elvacite 2045.
(2) Marketed by the Day-Glo Color Corporation under the trademark of DAY-GLO Fluorescent Pigment Signal Green A-18. This material comprises about 96 weight percent of melamine-sulfonamide-formaldehyde resin, 3 weight percent of a daylight fluorescent green dye and about 1 weight percent of a phthalocyanine green toner.
(3) Marketed by the Day-Glo Color Corporation under the trademark of DAY-GLO Fluorescent Pigment Horizon Blue A-19. This material comprises about 96 weight percent of melamine-sulfonamide-formaldehyde resin, 3 weight percent of a daylight fluorescent blue dye and about 1 weight percent of a phthalocyanine blue toner.
(4) Marketed by E. I. duPont de Nemours & Co., Inc.
(5) Marketed by Charles Pfizer & Co. under the trademark, MO-4232.

Each solution was coated onto a film of polyethylene terephthalate by conventional means. After drying, the green coating contained 20 weight percent isobutyl methacrylate, about 74 weight percent amino-triazine resin and about 6 weight percent sensible material. After drying, the black coating contained about 20 weight percent isobutyl methacrylate, about 20 weight percent iron oxide and about 58 weight percent amino-triazine resin. The resulting transfer media was placed over an enpaneled credit card base such that as prepared in example I of previously mentioned United States Patent application, Ser. No. 176,737, filed Aug. 31, 1971, of John J. Bishop with the coating in contact with the panel. The transfer media was subjected to a pressure of 14,000 psi for a time of 12 milliseconds from a raised character hammer. The transfer base was peeled away from the credit card. The coated, enpaneled credit card was subjected to a pressure of 20 psi and a temperature of 225° F. for a time of 0.5 seconds.

A durable coating on the credit card base is thus provided without protective overlays. The product is resistant to surface damage and provides excellent bonding between the coating, panel and credit card base.

EXAMPLE II

To demonstrate the durability of the coated, enpaneled credit cards prepared in Example I, the card was subjected to 500 passes from a Gardner Laboratory, Inc. Scratch Tester under a 500 gram load mounted perpendicular to the coating of the credit card. The Scratch Tester was modified in that a probe-tip reader was used in place of the U-shaped, wire stylus usually employed with this Tester. Visual inspection showed the coating to be essentially free of disruption. The code format on the card then was successfully sensed by a color bar code reader. A durable, encoded, enpaneled credit card is thus provided without protective overlays. The encoding is resistant to surface damage provided by the excellent bonding between the encoded marks, panel and credit card base.

EXAMPLE III

Color bar code credit cards were encoded nd the code panel heat fused in the same manner as described in Example I. The encoding was then exposed to ultraviolet light radiation in an Atlas Color Fade-Ometer, type FDA-R for a period of 48 hours. Subsequent testing and inspection of the code bars showed little degradation from the original spectral properties and the code formats were successfully scanned using a Color Bar Code Reader.

Although this invention has been described in considerable detail, it must be understood that such detail is for the purpose of illustration only and that many variations and modifications can be made by one skillein the art without departing from the scope and spirit thereof.

What is claimed is:

1. A transfer medium consisting of a dry sensible coating adhered to a flexible carrier substrate wherein the dry sensible coating consists of a sensible material in a binder consisting of a combination of aminotriazine resin and poly(isobutyl methacrylate) wherein, of the total coating, the sensible material is 5 to 25 weight percent, the aminotriazine resin is 60 to 85 weight percent and the poly(isobutyl methacrylate) is 10 to 25 weight percent.

2. A transfer medium according to claim 1 wherein the flexible carrier substrate is polyethylene terephthalate.

* * * * *